United States Patent

Wan et al.

[11] Patent Number: 5,393,393
[45] Date of Patent: Feb. 28, 1995

[54] PREPARATION OF HYDROGEN CYANIDE

[75] Inventors: Jeffrey K. S. Wan, Kingston, Canada; Theodore A. Koch, Wilmington, Del.

[73] Assignee: E. I. Du Pont de Nemours and Company, Wilmington, Del.

[21] Appl. No.: 10,569

[22] Filed: Jan. 28, 1993

[51] Int. Cl.6 .............................................. C01B 21/00
[52] U.S. Cl. .......................... 204/157.43; 204/157.46; 204/157.47; 204/157.52
[58] Field of Search ...................... 204/157.43, 157.46, 204/157.47, 157.52

[56] References Cited

U.S. PATENT DOCUMENTS 2,986,506 10/1958 Friel et al. ............................ 204/156
4,574,038 3/1986 Wan ..................................... 585/500
4,975,164 12/1990 Ravella et al. .................. 204/157.43

OTHER PUBLICATIONS

CA 76(4): 19174a "Chemical Physics in a microwave plasma–production of hydrogen cyanide."
Hawley's *Condensed Chemical Dictionary*, Eleventh Edition. Sax et al., Van Nostrand Reinhold Co. New York, 1987, p. 615.

*Primary Examiner*—John Niebling
*Assistant Examiner*—Cybille Delacroix-Muirheid

[57] ABSTRACT

Hydrogen cyanide is produced by reacting ammonia or urea and elemental carbon or a hydrocarbon while irradiating them with microwave energy.

6 Claims, No Drawings

PREPARATION OF HYDROGEN CYANIDE

FIELD OF THE INVENTION

This invention relates to the preparation of hydrogen cyanide (HCN) by irradiation of ammonia or urea and elemental carbon or a hydrocarbon using "microwave radiation". As used in this specification, the term "microwave radiation" means radiation having a frequency between 0.01 and 3 GHz. Sometimes in the art radiation below 0.5 GHz is referred to as radio frequency radiation.

BACKGROUND OF THE INVENTION

Hydrogen cyanide is highly toxic, but a commercially important chemical compound having a wide variety of industrial uses. Shipment of this compound presents potential hazards. One way to avoid these potential hazards is to produce the product at the site where it is to be used. However this requires the installation of a large number of small production facilities. Such production facilities have in the past been expensive. It is an objective of the present invention to provide a process for the production of HCN that can be operated on a relatively small scale but efficiently and at low installation cost.

The present invention employs the use of microwave frequency radiation to cause ammonia or urea to react with carbon. The use of microwave radiation to cause chemical reactions of various types is known; for example in Wan U.S. Pat. No. 4,574,038 ethylene is prepared by the conversion of methane using a metal powder catalyst.

SUMMARY OF THE INVENTION

The present invention is a process for the production of hydrogen cyanide which comprises contacting elemental carbon with ammonia vapor or urea while irradiating them with microwave radiation. In a preferred embodiment the carbon contains a metal catalyst such as rhodium, platinum, nickel, cobalt, lead, silver, copper, tungsten and ruthenium, and in a most preferred embodiment the microwave frequency radiation is pulsed. In the preferred embodiment the wavelength of the radiation is in the range of about 0.01 to 3 GHz and the radiation is supplied in pulses of about 0.5 to 10 seconds with off time of about 2 to 40 seconds.

DETAILED DESCRIPTION

A suitable microwave apparatus for carrying out the invention on a small scale is fully described in *Journal of Microwave Power and Electromagnetic Energy*, Vol. 25, pages 32-38 (1990) by Wan et. al. The microwave source described there is a Cober variable 3 kW 2.4 GHz magnetron, controlled by a custom pulse generator.

The process of the invention may be carried out at atmospheric pressure or if desired at higher or lower pressures. The carbon may contain one or more of the catalytic metals listed above. If such metals are included, the metal content will usually be in the amount of about 0.002 to about 1.0 percent by weight of the carbon. The metal may be deposited on the surface of the carbon or dispersed in the carbon. The preferred method of making carbon containing metal catalyst is by impregnation of the carbon with an organometallic or metal salt solution of the desired metal.

The use of pulsed irradiation allows the process to be operated in the most economical way. The reaction slows when the irradiation is off, but does not stop immediately. When the speed of the reaction reaches an unsatisfactory level, the irradiation source is activated and the reaction rate is again brought to a satisfactory level. The temperature of the gases at the exit of the reactor is about 100 degrees C. while the carbon surface is much hotter. Ammonia will normally be introduced into the reactor at ambient temperature (room temperature), but higher or lower temperatures may be used.

If desired the process can be operated using sources of nitrogen other than ammonia, for example it is believed possible to operate the process using urea as the source of nitrogen. The elemental carbon may be loaded into the reactor as carbon pellets, powder, chips or the like, or it may be formed in situ by the decomposition of a hydrocarbon feed material. For example methane gas can be fed to the reactor along with ammonia, and the methane will decompose to form carbon deposits in the reactor. When operating in this manner, the ammonia and methane are usually introduced into the reactor in about equal molar amounts. These carbon deposits will then react with ammonia to form HCN.

The amount of irradiation needed for the conversion of carbon and ammonia to one pound of HCN is theoretically about 1kWHr/lb; however, the operation is not that efficient since some heat is lost in heating up the reactants, and some heat is lost with the exit gases.

EXAMPLE

A quartz tube reactor was inserted inside a rectangular waveguide. A microwave radiation source having a 0 to 3000 watts 2.45 GHz generator was operated at 2500 watts and a pulse generator was used to produce individual pulses of 2.6 microseconds in duration at a frequency of 120 Hz. Two and one half grams of carbon was placed in the quartz tube and ammonia flow started at 5 cc/minute. The microwave generator was then turned on and the carbon heated with 300 ms pulses separated by off periods of between 5 and 10 seconds. Gas chromatography analysis of the products exiting the reactor after the system reached steady state showed 73.3% yield of HCN and about 18% acetonitrile based on ammonia.

We claim:

1. A process for the production of hydrogen cyanide which consists of contacting elemental carbon or elemental carbon containing a catalytic metal with a gas consisting of ammonia vapor, while irradiating the elemental carbon and the ammonia or elemental carbon containing a catalytic metal and the ammonia with microwave frequency radiation.

2. The process of claim 1 in which the microwave frequency radiation is applied in pulses.

3. The process of claim 1 in which the ammonia is at about ambient temperature when it is contacted with the carbon.

4. The process of claim 1 in which the catalytic metal is selected from the class consisting of rhodium, platinum, nickel, cobalt, lead, silver, copper ruthenium, and tungsten.

5. The process of claim 1 in which the pulsed microwave frequency radiation wavelength is in the range of about 0.01 to 3 GHz and the radiation is supplied in pulses of about 0.5 to 10 seconds with off times of about 2 to 40 seconds.

6. The process of claim 1 which is carried out at atmospheric pressure.

* * * * *